April 7, 1931. C. J. COBERLY 1,799,613
METHOD OF CUTTING METAL WITH A CUTTING GAS
Original Filed March 17, 1924
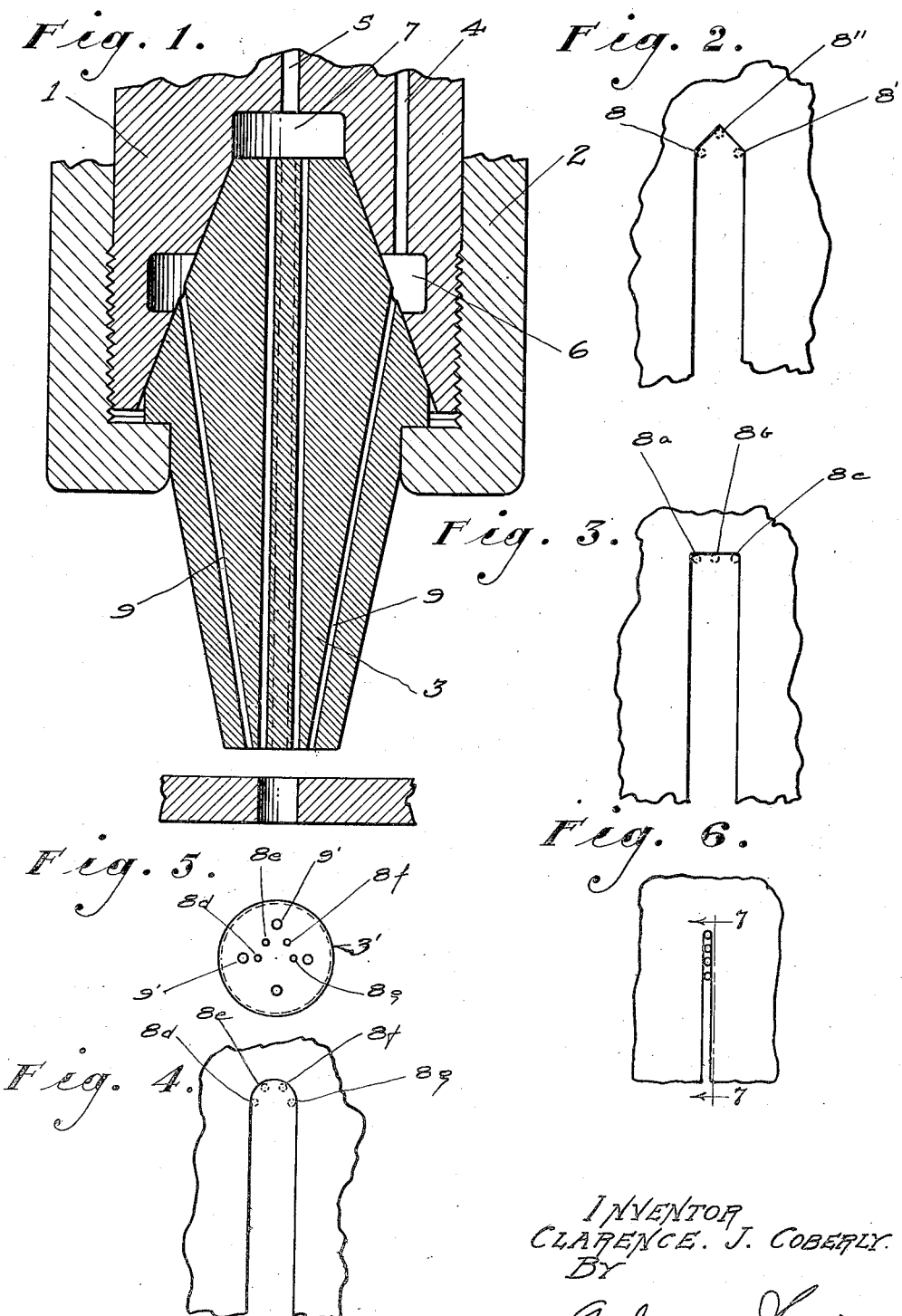
INVENTOR
CLARENCE. J. COBERLY.
BY
Graham + Harris
ATTORNEYS.

Patented Apr. 7, 1931

1,799,613

UNITED STATES PATENT OFFICE

CLARENCE J. COBERLY, OF LOS ANGELES, CALIFORNIA, ASSIGNOR TO KOBE, INC., OF LOS ANGELES, CALIFORNIA, A CORPORATION OF CALIFORNIA

METHOD OF CUTTING METAL WITH A CUTTING GAS

Application filed March 17, 1924, Serial No. 699,943. Renewed May 24, 1926.

Cutting a metal with cutting gas has heretofore been confined entirely to a method consisting in heating the metal, directing a single jet of cutting gas into the metal and moving the jet relative to the metal. In studying the results of using this method, I found that the efficiency of the method, under many circumstances, is extremely low.

In my subsequent experiments, I discovered that, in order to use oxygen efficiently in the single jet method, two factors have to be kept at certain experimentally predetermined standard values for cutting any given thickness of metal. These factors are the size of the jet and the pressure of the oxygen. The size of the jet, however, determines the width of the slot formed and consequently the amount of metal removed in the cutting. In some cases, and particularly in slotting screen pipe for oil wells, it is desirable to remove a very small amount of metal to form narrow slots. This cannot be done to form slots under a given width with the single jet method.

It is therefore an object of my invention to provide a method of cutting metals with a cutting gas in which relatively narrow slots may be formed with a cutting gas.

The limitation, for efficient operation of the single jet cutting porcess, to a certain size of jet and pressure of gas for each thickness of metal, also makes it impossible to produce relatively wide cuts efficiently by the single jet process.

It is therefore a further object of my invention to provide a method of cutting metals with a cutting gas in which relatively wide slots may be formed with an efficient consumption of cutting gas.

In cutting relatively wide slots in metal, it is sometimes desired that an end of the slot have a certain shape.

It is a still further object of my invention to provide a method of cutting a slot in metals with a cutting gas in which an end of the slot formed has a predetermined shape.

Other objects of my invention will appear from the following description of an advantageous embodiment of a torch tip capable of carrying out the method of my invention, taken in connection with the appended claims and the accompanying drawings, in which Fig. 1 is a vertical or longitudinal section, which may be a median section through the top of such a torch tip.

Fig. 2 is a diagram indicating the results as obtained by a different arrangement of cutting jets, to form a slot having a triangular end.

Fig. 3 is a similar diagram indicating the results obtainable by a slightly different arrangement of cutting jets, to form a slot having a substantially square or flat end.

Fig. 4 is an additional view similar to Figs. 1 and 2, but showing how a suitable arrangement of jets may be employed in the formation of a slot having a rounded end.

Fig. 5 is a bottom plan view of a torch tip suitable for use in the cutting of a slot such as is shown in Fig. 4.

Fig. 6 is a diagram showing the results obtained by placing the jets in line along the axis of movement.

Referring to the details of that specific embodiment of a torch for carrying out the method of my invention illustrated in Figs. 1 and 2, 1 may be the body or barrel of a cutting torch, and 2 may be a threaded collar or thimble for the retention of a removable tip 3 thereon, 4 and 5 being respectively ducts for the delivery of a combustible mixture and an excess of oxygen or other cutting gas into the respective chambers 6 and 7, serving as manifolds for the delivery of the mentioned gases through delivery passages or orifices in tip 3.

The cutting of slots in metallic bodies by imparting a suitable relative movement to a torch delivering an excess of a cutting gas being a well known operation, my invention involves a provision of means for the delivery of a plurality of jets of cutting gas, as by means of the substantially parallel ducts or passages 8, 8', 8", shown as extending longitudinally of the tip 3, these passages being optionally arranged at a uniform radial distance from the longitudinal axis of said tip and at a less distance from said axis than the additional and independent ducts 9, employed for the delivery of a combustible mixture at a rate suitable to the heating of a metallic object to a temperature favorable to the cutting of the same.

When the ducts 8, 8′, 8″ are arranged in a torch to form a triangle, this torch may be used to cut, at a single "pass", a comparatively wide slot and to give to the terminal portion thereof the angular configuration disclosed in Fig. 2. When it is desired to provide a slot with a comparatively abrupt or flat end, I may employ a suitable number of cooperating jets arranged in a straight line, as suggested at $8^a$, $8^b$ and $8^c$ in Fig. 3; and, to form a slot having a curved end, I may alternatively employ an arrangement such as is suggested in Figs. 4 and 5, in which the jets $8^d$, $8^e$, $8^f$ and $8^g$ may be arranged in an arc or at a uniform radial distance from the longitudinal axis of a tip 3′, provided with additional ducts 9′ for the delivery of a heating mixture.

In cutting a wide slot by the use of a plurality of jets of oxygen disposed abreast of each other, in tandem fashion or in curved or triangular formation, these jets may be separated laterally such a distance that portions of metal not touched by these jets are disposed between adjacent jets. These portions of metal intervening between the paths of adjacent jets, while not affected by the oxygen of the jets, are heated to the melting point, and fuse and pass downwardly with the slag formed by the jets. An analysis of the matter removed shows a mixture of pure metal and slag, the average content of oxygen in the mixture being much less than what it would be if this were all slag. A wide slot can thus be cut by a plurality of jets laterally disposed much more economically of oxygen than the same slot can be cut with a single jet.

As an example of the above noted economy, let us consider the facts with regard to cutting a ¼ inch slot in a steel plate ½ inch thick.

Such a slot is much wider than that produced by a jet of the size which can be used most efficiently in the single jet method for cutting ½ inch steel plate. This most efficient single jet for cutting this thickness of steel is .040 inches in diameter and operates with an oxygen speed of 2000 feet per second to cut a slot .060 inches wide. The velocity with which this jet is moved to cut the metal will be referred to as the "normal" cutting speed.

In order to cut a .250 inch slot with a single jet, the orifice producing this jet must have a diameter of .230 inches, and the velocity of the gas might possibly be reduced to as little as 1000 feet per second. Moreover, owing to the large size of the .230 inch orifice, the cutting speed might possibly be twice the normal cutting speed.

In cutting the slot .250 inches in width, by the method of my invention, four orifices of .035 inches diameter, spaced .067 inches apart would be used, making the distance between centers of the outer orifices .20 inches. The oxygen velocity would be 2000 feet per second and the speed of cutting would be normal.

The comparative quantities of gas per foot of cut consumed in forming a slot .250 inches in width, first, by the single jet process and, second, by the plural jet process of my invention, may be computed as follows:

Cutting .250 inch slot

I. With single .230 inch orifice—
Area of orifice = .166 square inches
Velocity of gas = 1000 feet per second
Cutting speed = 2 normal
Gas per foot cut = $\dfrac{.166 \times 1000}{2 \text{ normal}}$
or
$\dfrac{83}{\text{normal}}$ II. With four orifices .035 inch diameter—
Area of orifices = $4 \times .00385$
or
.0154 square inches
Velocity of gas = 2000 feet per second
Cutting speed = normal
Gas per foot cut = $\dfrac{.0154 \times 2000}{\text{normal}}$
or
$\dfrac{30.8}{\text{normal}}$ That is, the single jet method requires $\dfrac{83}{30.8}$ or 2.69 times as much oxygen per foot of cut as the method of my invention to produce a slot ¼ inch wide.

It is to be understood, moreover, that it is doubtful if under the most favorable conditions the single .230 inch jet would operate satisfactorily with an oxygen speed of as little as 1000 feet per second, nor it is at all likely that good cutting could be performed at a velocity of twice normal speed. These factors were assumed in order to favor the efficiency of the single jet method and it is not believed they could be secured in actual practice. As a matter of fact, the single jet would probably use over five times the amount of oxygen per foot of cut, in cutting a ¼ inch slot, as is used by my multiple jet process in accomplishing the same result.

Although the diameter of the ducts through which cutting gas is delivered, and the distances between the same, may be such as economically to cut, in a single pass, a slot of a predetermined maximum diameter, it will be understood that variations in the diameter of the slot cut may be effected by a suitable orientation of a torch or torch tip embodying my invention with reference to a plane extending between the delivery ducts for cutting gas and comprising the line of relative advance or traversing movement between my novel torch and the work slotted thereby.

For the purposes referred to, I consider it advantageous to employ, as described, a plurality of separate delivery ducts for cutting gas, rather than a single large delivery duct of either circular or non-circular outline; and I consider it advantageous to arrange the ducts 9, in any suitable number, for the delivery of a heating mixture, at practically a uniform radial distance from the longitudinal axis of a tip capable of carrying out the method of my invention.

Although I have herein described alternative embodiments capable of carrying out the method of my invention, it will be obvious to those skilled in the art that the principle illustrated herein is capable of embodiment in numerous additional alternative forms, and also that various features of my invention might be independently employed, without involving the slightest departure from the spirit and scope of my invention, as the same is indicated above and in the following claims.

For example, it may be desirable to place the ducts in a straight line along the axis of movement, as shown in Fig. 6, these ducts being all in the same plane or slightly inclined towards each other to give any desired slope to the side of the slot.

In arranging the plurality of jets utilized in the method of my invention, as shown in Fig. 6, the diameter of the jets used may be very much less than that of a single jet adapted for cutting metal of that thickness by the single jet method with a maximum of cutting gas efficiency. In fact, the amount of gas used per foot of cut in the method of my invention, in which the jets are disposed in tandem arrangement, will be approximately equal to that consumed by the single jet of maximum efficiency and will produce a much narrower slot than that produced by the single jet. As it is very desirable to produce such narrow slots in great quantities, it is extremely important that a method of efficiently producing these narrow slots be provided. In the operation of the process of my invention, as illustrated in Fig. 6, the metal is heated in advance of the cutting jets which are illustrated by small circles in this figure, and the cutting jets are then moved relative to the metal in tandem fashion so as to form a slot as indicated. The plurality of jets thus used cooperates to form the slot, the foremost of the jets cutting only partially through the metal, the second jet cutting slightly farther into the metal and so on until the last jet finishes the cut.

It is therefore seen that slots of any desired width may be produced by the method of my invention with a greater cutting gas economy than with the single jet method. Furthermore, it is possible to produce slots narrower than can be formed by the single jet method. Moreover, slots can be made by the method of my invention to a much greater width than is possible with the single jet method.

I claim as my invention:

1. A method of cutting a slot in metal which comprises: heating said metal; directing simultaneously a plurality of cutting jets from a point above the surface of and through an opening in said heated metal, said cutting jets being so arranged as to attack different portions of the walls of said opening; and thereafter causing a relative movement between the metal to be cut and said jets so that said opening is enlarged into a slot.

2. The method of cutting a slot in a metal member, from a starting point therein, which consists in heating said member adjacent said starting point, discharging simultaneously a plurality of spaced jets of cutting gas from a point above the surface of said metal member and into the same at said starting point and moving said jets relative to said member so that said jets cooperatively form said slot as they move.

3. The herein described method of cutting a slot with inclined walls and of predetermined contour in a metal member from a starting point therein, the steps which consist in heating said member adjacent said starting point, in directing simultaneously a plurality of jets of cutting gas at inclined positions relative to each other at a point above the surface of said metal member, maintaining the jets at such a position relative to each other and to said metal member as to cut therein inclined side walls, effecting the relative movement of said jets and said metal member to cause the jets to cooperatively form said slot as said relative movement is effected and to remove the metal therebetween during a single pass of the jets relative to the metal member.

In testimony whereof, I have hereunto set my hand at Los Angeles, California, this 7th day of March, 1924.

CLARENCE J. COBERLY.